United States Patent
Rieger

(10) Patent No.: US 8,166,842 B2
(45) Date of Patent: *May 1, 2012

(54) DUAL CLUTCH TRANSMISSION

(75) Inventor: Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 76 days.

This patent is subject to a terminal disclaimer.

(21) Appl. No.: 12/681,914

(22) PCT Filed: Oct. 8, 2008

(86) PCT No.: PCT/EP2008/063430
§ 371 (c)(1),
(2), (4) Date: Apr. 7, 2010

(87) PCT Pub. No.: WO2009/050078
PCT Pub. Date: Apr. 23, 2009

(65) Prior Publication Data
US 2010/0269611 A1    Oct. 28, 2010

(30) Foreign Application Priority Data
Oct. 15, 2007   (DE) .................... 10 2007 049 265

(51) Int. Cl.
*F16H 3/08*   (2006.01)
(52) U.S. Cl. ................ 74/330; 74/329; 74/331
(58) Field of Classification Search .......... 74/664, 74/665 R, 325, 329, 330, 331, 340
See application file for complete search history.

(56) References Cited

U.S. PATENT DOCUMENTS

| | | |
|---|---|---|
| 6,244,123 B1 | 6/2001 | Hegerath et al. |
| 7,246,536 B2 | 7/2007 | Baldwin |
| 7,287,442 B2 | 10/2007 | Gumpoltsberger |
| 2006/0054441 A1 | 3/2006 | Ruedle |
| 2010/0282019 A1* | 11/2010 | Rieger ............ 74/665 D |

FOREIGN PATENT DOCUMENTS

| | | |
|---|---|---|
| DE | 38 22 330 A1 | 7/1989 |
| DE | 102 39 540 A1 | 3/2004 |
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

OTHER PUBLICATIONS

Prof. Dr. R Tenberge; "Doppelkupplungsgetriebe in Planetenradbauweise Getriebestrukturen zwischen Automatik-und Doppelkupplungsgetrieben" Wissenportal baumaschine de Mar. 2007.

Primary Examiner — Justin Holmes
(74) Attorney, Agent, or Firm — Davis & Bujold, P.L.L.C.

(57) ABSTRACT

A dual-clutch transmission comprising clutches with input sides coupled to an input shaft and output sides respectively coupled to two transmission input shafts. Toothed idler gearwheels are mounted to rotate on countershafts while toothed fixed gearwheels are connected to the first and the second transmission input shafts and engage with the idler gearwheels. Coupling devices are provided for connecting the idler gearwheels to the countershaft, and drive output gearwheels are fixed to the countershafts and couple an output shaft, while a shifting element couples the input shafts such that eight forward gears and at least one reverse gear can be engaged. Four wheel planes are arranged in the transmission such that at least one winding gear can be engaged by the shifting element.

20 Claims, 1 Drawing Sheet

| GEAR | K1 | K2 | A | B | C | D | E | F | G | H | I |
|---|---|---|---|---|---|---|---|---|---|---|---|
| 1 | | ● | | | ● | | | | | | ● |
| 2 | ● | | | | ● | | | | | | |
| 3 | | ● | | | | | | ● | | | |
| 4 | ● | | | | | | | | ● | | |
| 5 | | ● | ● | | | | | | | | |
| 6 | ● | | | | | ● | | | | | |
| 7 | | ● | | | | | ● | | | | |
| 8 | ● | | | | | | | | | ● | |
| R1 | | ● | | ● | | | | | | | |
| R2 | ● | | | ● | | | | | | | ● |

DUAL CLUTCH TRANSMISSION

This application is a National Stage completion of PCT/EP2008/063430 filed Oct. 8, 2008, which claims priority from German patent application serial no. 10 2007 049 265.2 filed Oct. 15, 2007.

FIELD OF THE INVENTION

The present invention concerns a dual clutch transmission for a vehicle.

BACKGROUND OF THE INVENTION

From the document DE 103 05 241 A1 a six-gear or seven-gear dual clutch transmission is known. The dual clutch transmission has two clutches, each connected on its input side to the drive input shaft and on its output side to one of the two respective transmission input shafts. The two transmission input shafts are arranged coaxially with one another. Further, two countershafts are arranged axis-parallel to the two transmission input shafts, whose idler gearwheels mesh with fixed gearwheels of the transmission input shafts. Moreover, coupling devices are held rotationally fixed but able to move axially on the countershafts, in order to shift the respective gearwheels of the gears. The transmission ratio in each case is transmitted by the drive output gearwheels to a differential gearbox. To produce the desired transmission ratio steps with the known dual clutch transmissions a substantial number of wheel planes are required, so that the structural space required for installing them is not inconsiderable.

Further, from the document DE 38 22 330 A1 a spur gear variable-speed transmission is known. The spur gear variable-speed transmission comprises a dual clutch that can be shifted under load, one part of which is connected to a drive input shaft and whose other part is connected with a hollow drive input shaft mounted to rotate on the drive input shaft. For certain transmission ratios the drive input shaft can be coupled to the hollow drive input shaft by means of a shifting element.

From the document DE 10 2004 001 961 A1 a shift-under-load transmission with two clutches is known, each of which is associated with a part-transmission. The transmission input shafts of the two part-transmissions are arranged coaxially with one another and are engaged, via fixed gearwheels, with idler gearwheels of the associated countershafts. The respective idler gearwheels of the countershafts can be connected in a rotationally fixed manner to their countershafts by means of associated shifting elements. From that document a dual clutch transmission is known, which absolutely requires at least six wheel planes in the two part-transmissions. Thus, the structural space needed in the axial direction for installation of this transmission is larger, so the installation possibilities with the known transmission are considerably restricted.

SUMMARY OF THE INVENTION

The purpose of the present invention is to propose a dual clutch transmission of the type described at the start, with which on the one hand the shift-under-load transmission ratio steps can be produced with the least possible need for structural space, and on the other hand such that the transmission contains as few components as possible in order to keep the production costs of the transmission low.

Thus, a dual clutch transmission with only four wheel planes in the part-transmissions is produced, such that to enable winding gears the two part-transmissions can be coupled by means of at least one additional shifting element. In this way, in the proposed dual clutch transmission a maximum number of transmission ratios can be produced with the fewest possible wheel planes, preferably such that all the forward gears and reverse gears can be shifted under load in sequence.

In the case of a winding gear, gearwheels of gears in the two part-transmissions are coupled with one another in order to produce a force flow through both part-transmissions. The shifting element used in each such case serves to couple together two idler gearwheels and thereby brings the transmission input shafts into relationship with one another. Regardless of the embodiment variant of the dual clutch transmission concerned, the arrangement of the shifting element for coupling two particular idler gearwheels can be varied, so the shifting element does not necessarily have to be arranged between the idler gearwheels to be coupled.

Thanks to the small number of wheel planes required, the axial length of the proposed transmission is short, whereby even front transverse mounting in vehicles is made possible. Since the dual clutch transmission according to the invention also contains winding gears and by virtue of its three-shaft configuration, multiple uses of individual wheel pairs or wheels are enabled, which leads to a saving of components in the transmission.

In the dual clutch transmission according to the invention so-termed dual wheel planes and/or single wheel planes can be provided. In a dual wheel plane, a respective idler gearwheel of each of the countershafts is associated with a fixed gearwheel of one of the transmission input shafts. In contrast, in a single wheel plane only one idler gearwheel of one countershaft is associated with a fixed gearwheel of one of the transmission input shafts. Since in each dual wheel plane at least one idler gearwheel can be used for at least two gears, owing to this possible multiple use of idler gearwheels a given number of transmission ratios can be produced with fewer wheel planes. Thus, the structural length of the transmission is reduced. A dual wheel plane can be replaced by two single wheel planes.

The winding gears can be produced by means of a plurality of wheel pairs or wheel planes, so that other gears can be shifted by means of the individual wheel pairs or wheel planes of the winding gears. In addition, the proposed transmission has a large degree of freedom in relation to the spread of transmission ratios and the transmission steps that can be realized.

The proposed wheel planes give a gearset arrangement in the dual clutch transmission according to the invention with at least eight forward transmission ratios and a number of reverse transmission ratios, such that at least one winding gear can be realized in the first gear step and in one of the reverse gears. In addition, further winding gears can be engaged as the second to the eighth gear or even as a reverse gear, such that at least the eighth gear can be shifted under load as a function of the seventh gear. In a sequential design, all the forward gears and reverse gears should be able to shift under load. Winding gears that cannot be shifted under load can be provided as intermediate gears whose transmission ratio is in each case between the transmission ratios of two main driving gears, as overdrives or over-speed gears in which the transmission ratio is in each case smaller than the lowest transmission ratio of the main driving gear (6th gear), as off-road gears or as crawling gears in which the transmission ratio is in each case larger than the transmission ratio of the first gear, and/or as further reverse gears.

In the dual clutch transmission according to the invention the load-shiftable reverse gears are produced by only one additional meshing engagement or only one additional gearwheel, such that at least by virtue of the additional rotational speed reversing gearwheel step a reverse gear can be produced as a winding gear and another reverse gear can be produced directly by the gearwheel step. The transmission ratios of the reverse gears can be varied, for example by means of an additional step wheel or suchlike.

In an embodiment variant of the present invention it can be provided that the four wheel planes are produced for example by at most two fixed gearwheels on each transmission input shaft, which engage for example with at most four idler gearwheels of the two countershafts. Other design configurations are also possible for producing the four wheel planes.

To connect the idler gearwheels of the countershafts in a rotationally fixed manner to their respective countershafts for the individual transmission ratio steps, a plurality of, for example, two-sided action coupling devices are provided. Preferably, the coupling devices can in each case be arranged between the first wheel plane and the second wheel plane and between the third wheel plane and the fourth wheel plane on each countershaft. For example, one-sided action coupling devices can also be used. As coupling devices, for example hydraulically actuated clutches or even interlocking claw clutches and any type of synchronizers can be used.

The additional shifting element for coupling the part-transmissions can be arranged on the second countershaft between the second and third wheel planes. Other possible arrangements are also conceivable and further shifting elements can be used.

It is conceivable for the possible arrangements indicated to be varied and also the number of toothed gearwheels and the number of coupling devices to be changed, in order to realize still more load-shifting or non load-shifting gears in a manner that saves both structural space and components in the proposed dual clutch transmission. In addition, the respective arrangement positions of the coupling devices on the wheel planes can be varied. Furthermore, the action direction of the coupling devices can be changed or extended.

Regardless of the respective embodiment variant of the dual clutch transmission, the drive input shaft and the drive output shaft can preferably not be arranged coaxially with one another, whereby a particularly space-saving arrangement is produced. For example the shafts accordingly spatially arranged one behind the other can also be slightly offset relative to one another. With this arrangement a direct gear with a transmission ratio equal to one can be realized by meshing, and can advantageously be positioned relatively freely on the sixth, seventh or eighth gear. Other possible arrangements of the drive input and drive output shafts are also conceivable.

Preferably, the proposed dual clutch transmission is equipped with an integrated drive output stage. As the drive output gear, the output stage can comprise a fixed gearwheel on the output shaft, which meshes both with a fixed gearwheel of the first countershaft and with a fixed gearwheel of the second countershaft.

Advantageously, the lower forward gears and the reverse gears can be actuated by a starting or shifting clutch so as to concentrate higher loads on the clutch, thereby allowing the second clutch to be made more compactly and inexpensively. In particular, the wheel planes in the proposed dual clutch transmission can be so arranged that starting can be carried out either via the inner transmission input shaft or via the outer transmission input shaft and thus by means of whichever clutch is best suited, which is also possible with a concentrically arranged, radially nested configuration of the dual clutch one inside the other. For that purpose the wheel planes can be arranged correspondingly mirror-symmetrically or exchanged. It is also possible for the countershafts to be arranged the other way around or mirror-symmetrically.

BRIEF DESCRIPTION OF THE DRAWINGS

Below, the present invention will be explained in more detail with reference to the drawings.

DETAILED DESCRIPTION OF THE PREFERRED EMBODIMENTS

Figures 1, 1A:
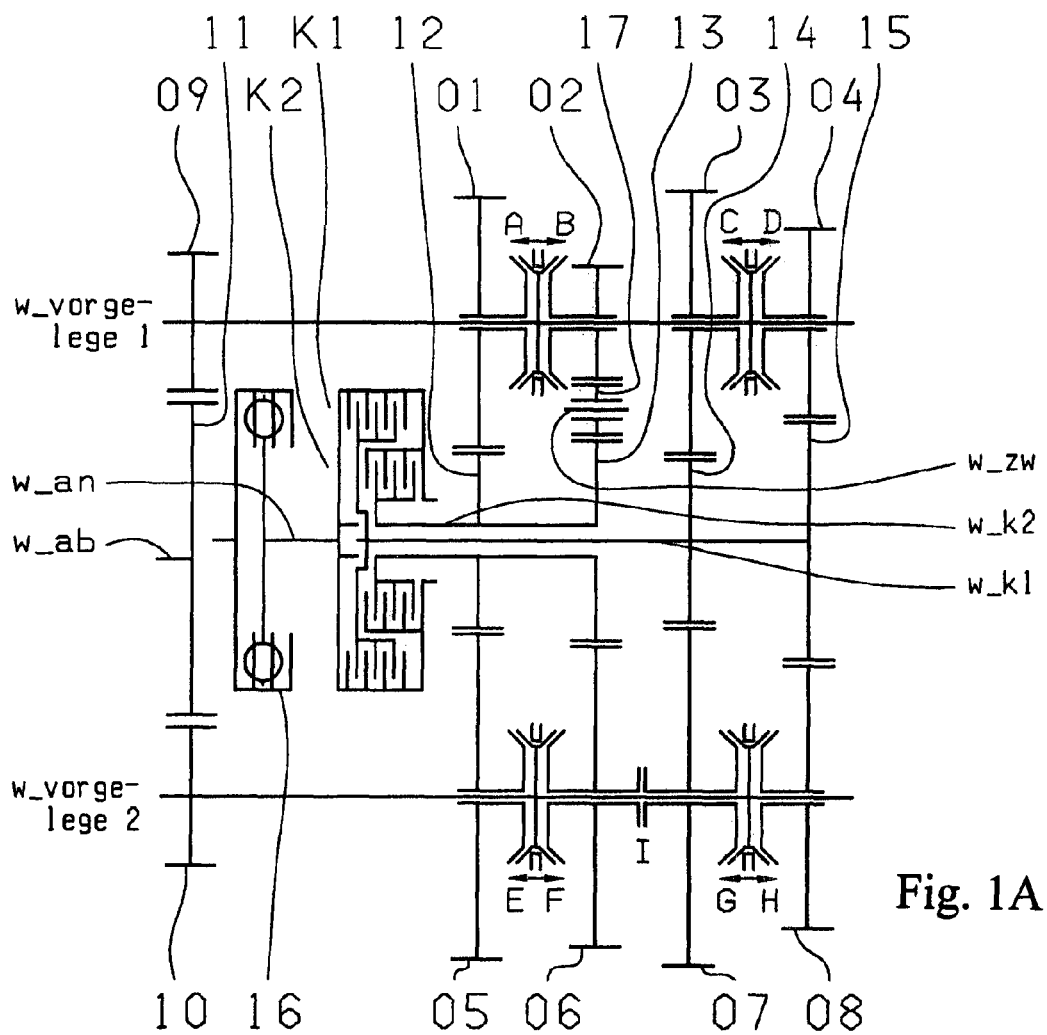
FIG. 1A shows a schematic view of a possible embodiment variant of the dual clutch transmission according to the invention.
FIG. 1 is an example shifting scheme of the dual clutch transmission according to FIG. 1.

FIG. 1A shows an eight-gear dual clutch transmission comprising two clutches K1, K2 whose input sides are connected to a drive input shaft w_an. In addition a torsional oscillation damper 16 can be arranged on the drive input shaft w_an. The output sides of the clutches K1, K2 are respectively connected to one of two transmission input shafts w_K1, w_K2 which are arranged coaxially with one another. The first transmission input shaft w_K1 is made as a solid shaft and the second transmission input shaft w_K2 as a hollow shaft. Furthermore, two countershafts w_vorgelege1, w_vorgelege2 are provided, which are arranged axis-parallel to one another. The two transmission input shafts w_K1 and w_K2 can be coupled by means of a shifting element I with tooth engagement, so that the transmission input shafts w_K1 and w_K2 are brought into relationship.

In the eight-gear dual clutch transmission according to the invention there are only four wheel planes 01-05, 02-06, 03-07, 04-08 for producing the eight forward transmission ratios and the two reverse transmission ratios. In the example embodiment variant shown, the four wheel planes 01-05, 02-06, 03-07, 04-08 are formed respectively by two fixed gearwheels 12, 13; 14, 15 of the two transmission input shafts w_K1, w_K2 and by four idler gearwheels 01, 02, 03, 04 on the first countershaft w_vorgelege1 and four idler gearwheels 05, 06, 07, 08 on the second countershaft w_vorgelege2.

Thus, in the embodiment variant of the dual clutch transmission shown, all the wheel planes 01-05, 02-06, 03-07 and 04-08 are in the form of so-termed dual wheel planes.

In the first wheel plane 01-05, the fixed gearwheel 12 of the second transmission input shaft w_K2 meshes both with the idler gearwheel 01 of the first countershaft w_vorgelege1 and with the idler gearwheel 05 of the second countershaft w_vorgelege2.

The second wheel plane 02-06 comprises the fixed gearwheel 13 of the second transmission input shaft w_K2, which meshes with the idler gearwheel 06 of the second countershaft w_vorgelege2. Furthermore, an idler gearwheel 17 arranged on an intermediate shaft w_zw meshes both with the fixed gearwheel 13 of the second transmission input shaft w_K2 and with the idler gearwheel 02 of the first countershaft w_vorgelege1. In this way rotation is reversed for producing the reverse gears R1 and R2. The idler gearwheel 17 can also be made as a step wheel. For the reversal of rotation of the idler gearwheel 06 of the second countershaft w_vorgelege2 meshes with the idler gearwheel 02 of the first countershaft w_vorgelege1, and there is then no need for the idler gearwheel 17.

The third wheel plane 03-07 comprises the fixed gearwheel 14 of the first transmission input shaft w_K1, which meshes both with the idler gearwheel 03 of the first countershaft w_vorgelege1 and with the idler gearwheel 07 of the second countershaft w_vorgelege2. Finally, in the fourth wheel plane 04-08 the fixed gearwheel 15 of the first transmission input shaft w_K1 meshes both with the idler gearwheel 04 of the first countershaft w_vorgelege1 and with the idler gearwheel 08 of the second countershaft w_vorgelege2.

In this proposed gearset arrangement, respective two-sided action coupling devices A-B, E-F are provided on each of the countershafts w_vorgelege1, w_vorgelege2 between the first wheel plane 01-05 and the second wheel plane 02-06. Furthermore, respective two-sided action coupling devices C-D and G-H are arranged on each of the countershafts w_vorgelege1, w_vorgelege2 between the third wheel plane 03-07 and the fourth wheel plane 04-08.

To produce winding gears as well, i.e. to be able to couple the two part-transmissions with one another, the additional shifting element I is provided on the second countershaft w_vorgelege2 between the second wheel plane 02-06 and the third wheel plane 03-07.

The table in FIG. 1 shows an example shifting scheme for this possible embodiment variant of the eight-gear dual clutch transmission.

According to the shifting scheme shown in the table, the first forward gear 1 is engaged as a winding gear by means of the second clutch K2, the coupling device C-D pushed in the C direction and the activated shifting element I. The second forward gear 2 is produced by the first clutch K1 and the coupling device C-D pushed in the C direction, and the third forward gear 3 is engaged by the second clutch K2 and the coupling device E-F pushed in the F direction. The fourth forward gear 4 is again engaged by means of the first clutch K1 and the coupling device G-H pushed in the G direction, and the fifth forward gear 5 is produced by the second clutch K2 and the coupling device A-B pushed in the A direction. The sixth forward gear 6 is engaged by the first clutch K1 and the coupling device C-D pushed in the D direction, and the seventh forward gear 7 is engaged by the second clutch K2 and the coupling device E-F pushed in the E direction. The eighth forward gear 8 is engaged by the first clutch K1 and the coupling device G-H pushed in the H direction.

The first reverse gear R1 is engaged by means of the second clutch K2 and the coupling device A-B pushed in the B direction, and the second reverse gear R2 is engaged as a winding gear by the first clutch K1, the coupling device A-B pushed in the B direction and the activated shifting element I.

Accordingly, as a winding gear the first forward gear 1 uses the toothed gearwheels 13, 06, 07, 14, 03 and 09. In the second forward gear 2 the gearwheels 14, 03 and 09 are used, and to produce the third forward gear 3 the gearwheels 13, 06 and 10 are used. In the fourth forward gear 4 the gearwheels 14, 07 and 10 are used, in the fifth forward gear 5 the gearwheels 12, 01 and 09 are used, and the sixth forward gear 6 uses the gearwheels 15, 04 and 09. The seventh forward gear 7 uses the gearwheels 12, 05 and 10. Finally, the eighth forward gear 8 is engaged by the gearwheels 15, 08 and 10.

In the first reverse gear R1 the gearwheels 13, 17, 02 and 09 are used, and the second reverse gear R2, as a winding gear, uses the gearwheels 14, 07, 06, 13, 17, 02 and 09.

In this embodiment variant, however, other allocations of the individual gear steps in relation to the clutches are also possible. In particular for example, a converse allocation can be realized in the simplest manner by mirror reflection.

In the embodiment variants described above, the direction indicated in each case, in which the coupling devices have to be pushed in order to connect a desired idler gearwheel with the countershaft concerned, can be changed by modifying the coupling devices, for example with appropriate reversing elements.

INDEXES

01 Idler gearwheel of the first countershaft
02 Idler gearwheel of the first countershaft
03 Idler gearwheel of the first countershaft
04 Idler gearwheel of the first countershaft
05 Idler gearwheel of the second countershaft
06 Idler gearwheel of the second countershaft
07 Idler gearwheel of the second countershaft
08 Idler gearwheel of the second countershaft
09 Fixed gearwheel of the first countershaft as a drive output stage
10 Fixed gearwheel of the second countershaft as a drive output stage
11 Fixed gearwheel of the drive output shaft
12 Fixed gearwheel of the second transmission input shaft
13 Fixed gearwheel of the second transmission input shaft
14 Fixed gearwheel of the first transmission input shaft
15 Fixed gearwheel of the first transmission input shaft
16 Torsional vibration damper
K1 First clutch
K2 Second clutch
w_an Drive input shaft
w_ab Drive output shaft
w_vorgelege1 First countershaft
w_vorgelege2 Second countershaft
A-B Two-sided action coupling device
C-D Two-sided action coupling device
E-F Two-sided action coupling device
G-H Two-sided action coupling device
F-G Two-sided action coupling device
I Additional shifting element
i Transmission ratio
phi Transmission spread
1 First forward gear
2 Second forward gear
3 Third forward gear
4 Fourth forward gear
5 Fifth forward gear
6 Sixth forward gear
7 Seventh forward gear
8 Eighth forward gear
R1 First reverse gear
R2 Second reverse gear
w_zw Intermediate shaft
17 Idler gearwheel

The invention claimed is:

1. A dual-clutch transmission comprising:
first and second clutches (K1, K2) having input sides connected to a drive input shaft (w_an) and output sides that are respectively connected to one of first and second transmission input shafts (w_K1, w_K2) arranged coaxially with one another;
at least two countershafts (w_vorgelege1, w_vorgelege2) rotatably supporting toothed idler gearwheels (01, 02, 03, 04, 05, 06, 07, 08);
toothed fixed gearwheels (12, 13, 14, 15) being connected in a rotationally fixed manner to one of the first and the second transmission input shafts (w_K1, w_K2) and engaging at least some of the idler gearwheels (01, 02, 03, 04, 05, 06, 07, 08);
a plurality of coupling devices (A-B, C-D, E-F, G-H), each coupling at least one of the idler gearwheels (01, 02, 03, 04, 05, 06, 07, 08) to one of the first and the second countershafts (w_vorgelege1, w_vorgelege2) in a rotationally fixed manner;
a respective drive output gearwheel (09, 10) being fixed to each of the first and the second countershafts (w_vorgelege1, w_vorgelege2) and coupled with a drive output shaft (w_ab);
at least one shifting element (I) for engaging the first and the second transmission input shafts (w_K1, w_K2) such that at least eight shift-under-load forward gears (1, 2, 3, 4, 5, 6, 7, 8) and at least one reverse gear (R1, R2) are engagable; and four gearwheel planes (01-05, 02-06, 03-07, 04-08) being arranged such that at least one shift-under-load winding gear is engagable with the shifting element (I).

2. The dual-clutch transmission according to claim 1, wherein at least one of the shift-under-load gears and a non shift-under-load winding gear is at least one of an overdrive, an off-road gear, an intermediate gear and an additional reverse gear.

3. The dual-clutch transmission according to claim 1, wherein at least a first forward gear (1) and a second reverse gear (R2) are shifted as shift-under-load winding gears.

4. The dual-clutch transmission according to claim 1, wherein the four wheel planes (01-05, 02-06, 03-07, 04-08) comprises a pair of the fixed gearwheels (12, 13) supported by the first transmission input shaft (w_K1) and a pair of the fixed gearwheels (14, 15) supported by the second transmission input shaft (w_K2) and four of the idler gearwheels (01, 02, 03, 04) supported by the first countershaft (w_vorgelege1) and four idler gearwheels (05, 06, 07, 08) supported by the second countershaft (w_vorgelege2).

5. The dual-clutch transmission according to claim 1, wherein a fixed gearwheel (12) of the second transmission input shaft (w_K2) engages, in a first wheel plane (01-05), a first idler gearwheel (01) of the first countershaft (w_vorgelege1) and a first idler gearwheel (05) of the second countershaft (w_vorgelege2).

6. The dual-clutch transmission according to claim 1, wherein a fixed gearwheel (13) of the second transmission input shaft (w_K2) engages, in a second wheel plane (02-06), a second idler gearwheel (06) of the second countershaft (w_vorgelege2) and an idler gearwheel (17) that engages both the fixed gearwheel (13) of the second transmission input shaft (w_K2) and a second idler gearwheel (02) of the first countershaft (w_vorgelege1).

7. The dual-clutch transmission according to claim 6, wherein the idler gearwheel (17) that engages the second idler gearwheel (02) of the first countershaft (w_vorgelege1) is supported by an intermediate shaft (w_zw).

8. The dual-clutch transmission according to claim 1, wherein the second idler gearwheel (02) of the first countershaft (w_vorgelege1) engages the second idler gearwheel (06) of the second countershaft (w_vorgelege2).

9. The dual-clutch transmission according to claim 6, wherein the idler gearwheel (06, 17) that engages the idler second gearwheel (02) of the first countershaft (w_vorgelege1) is a step wheel.

10. The dual-clutch transmission according to claim 1, wherein a fixed gearwheel (14) of the first transmission input shaft (w_K2) engages, in a third wheel plane (03-07), a third idler gearwheel (03) of the first countershaft (w_vorgelege1) and a third idler gearwheel (07) of the second countershaft (w_vorgelege2).

11. The dual-clutch transmission according to claim 1, wherein a fixed gearwheel (15) of the first transmission input shaft (w_K1) engages, in a fourth wheel plane (04-08), a fourth idler gearwheel (04) of the first countershaft (w_vorgelege1) and a fourth idler gearwheel (08) of the second countershaft (w_vorgelege2).

12. The dual-clutch transmission according to claim 1, wherein a two-sided action coupling device (A-B) is supported on the first countershaft (w_vorgelege1) between a first wheel plane (01-05) and a second wheel plane (02-06).

13. The dual-clutch transmission according to claim 1, wherein a two-sided action coupling device (C-D) is supported on the first countershaft (w_vorgelege1) between a third wheel plane (03-07) and a fourth wheel plane (04-08).

14. The dual-clutch transmission according to claim 1, wherein a two-sided action coupling device (E-F) is supported on the second countershaft (w_vorgelege2) between a first wheel plane (01-05) and a second wheel plane (02-06).

15. The dual-clutch transmission according to claim 1, wherein a two-sided action coupling device (G-H) is supported on the second countershaft (w_vorgelege2) between a third wheel plane (03-07) and a fourth wheel plane (04-08).

16. The dual-clutch transmission according to claim 1, wherein the shifting element (I) is located on the second countershaft (w_vorgelege2) between a second wheel plane (02-06) and a third wheel plane (03-07).

17. The dual-clutch transmission according to claim 1, wherein
a first forward gear (1) is engaged as a winding gear by engagement of the second clutch (K2), a second coupling device (C-D) biased in a first direction (C) and activation of the shifting element (1),
a second forward gear (2) is engaged by engagement of the first clutch (K1) and the second coupling device (C-D) biased in the first direction (C),
a third forward gear (3) is engaged by engagement of the second clutch (K2) and a third coupling device (E-F) biased in a second direction (F),
a fourth forward gear (4) is engaged by engagement of the first clutch (K1) and a fourth coupling device (G-H) biased in a first direction (G);
a fifth forward gear (5) is engaged by engagement of the second clutch (K2) and a first coupling device (A-B) biased in a first direction (A);
a sixth forward gear (6) is engaged by engagement of the first clutch (K1) and the second coupling device (C-D) biased in a second direction (D);
a seventh forward gear (7) is engaged by engagement of the second clutch (K2) and the third coupling device (E-F) biased in a first direction (E);
an eighth forward gear (8) is engaged by engagement of the first clutch (K1) and the fourth coupling device (G-H) biased in a second direction (H);
a first reverse gear (R1) is engaged by engagement of the second clutch (K2) and the first coupling device (A-B) biased in a second (B) direction; and
a second reverse gear (R2) is engaged as a winding gear by engagement of the first clutch (K1), the first coupling device (A-B) biased in the second direction (B) and activation of the shifting element (I).

18. The dual-clutch transmission according to claim 1, wherein the drive input shaft (w_an) and the drive output shaft (w_ab) are arranged at an angle to one another.

19. The dual-clutch transmission according to claim 1, wherein an integrated drive output stage comprises a fixed gearwheel (11) supported by a drive output shaft (w_ab) which engages a further fixed gearwheel (09) of the first countershaft (w_vorgelege1) and a further fixed gearwheel (10) of the second countershaft (w_vorgelege2).

20. The dual-clutch transmission according to claim 1, wherein lower forward gears and the at least one reverse gear are engaged by engagement of one of the first and the second clutches (K1, K2) which is forms one of a starting clutch and a shifting clutch.

* * * * *